United States Patent
Brown et al.

(10) Patent No.: US 11,067,834 B2
(45) Date of Patent: Jul. 20, 2021

(54) HIGH REFRACTIVE INDEX POLARIZED SPECTACLE LENS

(71) Applicant: Carl Zeiss Vision International GmbH, Aalen (DE)

(72) Inventors: Stephen Brown, Adelaide (AU); Jingye Liang, Guangzhou (CN); Ben Ryan, Port Noarlunga South (AU)

(73) Assignee: Carl Zeiss Vision International GmbH, Aalen (DE)

( * ) Notice: Subject to any disclaimer, the term of this patent is extended or adjusted under 35 U.S.C. 154(b) by 461 days.

(21) Appl. No.: 16/172,450

(22) Filed: Oct. 26, 2018

(65) Prior Publication Data

US 2019/0064549 A1    Feb. 28, 2019

Related U.S. Application Data

(63) Continuation of application No. PCT/CN2016/080481, filed on Apr. 28, 2016.

(51) Int. Cl.
*G02C 7/12* (2006.01)
*G02C 7/02* (2006.01)
*G02B 1/14* (2015.01)
*G02B 5/30* (2006.01)

(52) U.S. Cl.
CPC .......... *G02C 7/12* (2013.01); *G02C 7/02* (2013.01); *G02B 1/14* (2015.01); *G02B 5/3075* (2013.01); *G02C 2202/16* (2013.01)

(58) Field of Classification Search
CPC ........ G02C 7/12; G02C 7/02; G02C 2202/16; G02B 1/14; G02B 5/3075; G02B 5/3083; G02B 5/30; G02B 1/041; G02B 5/3033; G02B 2027/0178; G02F 1/133528; G02F 2202/28; G02F 1/133512

See application file for complete search history.

(56) References Cited

U.S. PATENT DOCUMENTS

| | | | |
|---|---|---|---|
| 6,650,473 B2 | 11/2003 | Nakagoshi | |
| 6,807,006 B2 | 10/2004 | Nakagoshi | |
| 7,289,257 B1 | 10/2007 | Nakagoshi | |
| 7,350,917 B2 | 4/2008 | Kawai et al. | |

(Continued)

FOREIGN PATENT DOCUMENTS

| | | |
|---|---|---|
| CN | 100472227 C | 3/2009 |
| CN | 101495909 A | 7/2009 |
| CN | 101874222 A | 10/2010 |
| JP | 2008213436 A | 9/2008 |
| WO | 2016006478 A1 | 1/2016 |

OTHER PUBLICATIONS

Office Action of the Chinese Patent Office (CNIPO) in CN 201680084993.2, which is a counterpart hereof, dated Apr. 7, 2020, and English-language translation thereof.

(Continued)

*Primary Examiner* — James C. Jones
(74) *Attorney, Agent, or Firm* — Thrive IP®; Georg M. Hasselmann

(57) ABSTRACT

A high refractive index, polarized spectacle lens and a process for the production of the lens are provided. The lens includes a high refractive index lens substrate and a multi-layer, polarized film. The multi-layer, polarized film, in turn, includes at least one transparent support layer and at least two adhesion layers, wherein at least one of the adhesion layers is a polarized adhesion layer.

23 Claims, 1 Drawing Sheet

(56) References Cited

U.S. PATENT DOCUMENTS

| | | | |
|---|---|---|---|
| 8,092,726 B2 | 1/2012 | Hsu | |
| 2005/0168690 A1* | 8/2005 | Kawai | G02C 7/12 351/159.6 |
| 2005/0243274 A1 | 11/2005 | Chou | |
| 2007/0195422 A1 | 8/2007 | Begon et al. | |
| 2013/0058253 A1 | 3/2013 | Maruta et al. | |
| 2013/0242393 A1* | 9/2013 | Ryu | G02B 5/3033 359/488.01 |
| 2017/0153464 A1 | 6/2017 | Tamura et al. | |

OTHER PUBLICATIONS

Office Action of the European Patent Office (EPO) in EP 16 899 800.3, which is a counterpart hereof, dated Apr. 16, 2020.

Office Action of the European Patent Office (EPO) in EP 16 899 800.3, which is a counterpart hereof, dated Oct. 9, 2020.

International Search Report issued in PCT/CN2016/080481, to which this application claims priority, dated Jan. 25, 2017.

Written Opinion issued in PCT/CN2016/080481, to which this application claims priority, completed Jan. 22, 2017.

Office Action of the Chinese Patent Office (SIPO) in CN , which is a counterpart hereof, dated Jul. 16, 2019, and English-language translation thereof.

Office Action of the European Patent Office (EPO) in EP 16 89 9800.3, which is a counterpart hereof, dated Oct. 16, 2019.

Office Action of the Chinese Patent Office (SIPO) in CN 216080084993. 2, which is a counterpart hereof, dated Dec. 25, 2019, and English-language translation thereof.

Extended European Search Report dated Feb. 26, 2019 in EP 16 89 9800, which is a counterpart hereof.

International Preliminary Examination Report dated Aug. 23, 2018 in PCT/CN2016/080481, to which this application claims priority.

* cited by examiner

HIGH REFRACTIVE INDEX POLARIZED SPECTACLE LENS

CROSS REFERENCE TO RELATED APPLICATIONS

This application is a continuation application of international application PCT/CN2016/080481, filed Apr. 28, 2016, which is hereby incorporated by reference in its entirety.

TECHNICAL FIELD

The present disclosure relates to spectacle lenses for spectacles, typically for sunglasses, the spectacle lenses being polarized lenses formed from a high refractive index substrate such as a polyurethane.

BACKGROUND

Spectacle lenses are those that are used in spectacles, for either outdoor or indoor use, typically providing corrective vision for wearers to accommodate for physiological errors in the human eye, but also being plano and being for aesthetic, protective, or fashion purposes. Glass and plastic have both been successfully used as substrates for spectacle lenses, with plastic lenses becoming popular from the 1960's on with the advent of new plastic materials with improved properties.

Some common plastic materials used to manufacture spectacle lenses include polyethylene glycol diallyl dicarbonate (CR39™) and polycarbonate. In response to a need to produce thinner lenses, a number of "high index" plastic materials have been developed for the manufacture of spectacle lenses, and are now very popular and very successful. These "high index" materials have a higher refractive index (typically above 1.55) than other conventional plastic materials, which means that they bend light more than the conventional plastic materials. As a result, less high refractive index lens material needs to be used to produce the same prescription than with a conventional plastic material. This desirably results in lenses that are lighter with thinner edges.

Spectacle lenses for outdoor use, usually referred to as sunglass lenses, have traditionally been uniformly tinted so as to reduce glare and light transmission for the comfort of the wearer. However, these lenses indiscriminately filter light of all polarizations, i.e., whether the light is aligned horizontally or vertically. Therefore, glare is dampened, but not eliminated. More importantly, by filtering all components of light, visual acuity is diminished.

Light is made up of waves travelling in different directions. Vertical light is useful to the human eye, however horizontal light commonly exists in higher proportions as glare. Glare is concentrated light reflecting off a horizontal shiny surface, such as a car windscreen, sand, water, snow, or asphalt roads, which reduces visibility and can make it uncomfortable, painful, or even dangerous to carry on driving, cycling, skiing, etc. Accordingly, polarized spectacle lenses were developed for outdoor use that allow the vertical component of light, which is preferred for clear vision, to pass, while eliminating the easily scattered and skewed horizontal component of light. Vertically aligned light is preferred because it respects the natural tendency of the visual system to focus on the vertical component of an image.

Typically, polarized spectacle lenses include linear polarized film layers, such as polyvinyl alcohol polymer layers, having aligned dichroic dyes to extinguish the horizontal component of reflected sunlight. In this respect, the components of light that are aligned with the axis of the polarizer are absorbed, allowing only the light oscillating with a wave aligned perpendicular to the axis of the polarizer to pass through the polarized film layer. Such polarized film layers are however very delicate and readily absorb moisture during handling and manufacture. Accordingly, it is common to encapsulate such polarized film layers in protective and supportive outer layers, forming a multi-layer polarizing film.

With such traditional multi-layer polarizing films, it has been found that some of the more recently developed high refractive index lens substrates such as polyurethanes have difficulty bonding to the typical supportive outer layers of the multi-layer polarizing film, which have been developed for the more common polyethylene glycol diallyl dicarbonate (CR39™) and polycarbonate lens substrates. As a result, with high refractive index lens substrates, single-layer polarizing films (for example having a single polyvinyl alcohol polymer layer) have been adopted, without the supportive outer layers, which have proven to be difficult to use and have thus resulted in lower take-up of high refractive index lens substrates for polarized spectacle lenses.

It is an object of the present disclosure to provide a high refractive index, polarized spectacle lens, typically for use as a sunglass lens, which is easier to manufacture.

SUMMARY

The present disclosure provides a high refractive index, polarized spectacle lens comprising a high refractive index lens substrate and a multi-layer, polarized film, the multi-layer, polarized film comprising at least one support layer and at least two adhesion layers, wherein at least one adhesion layers is a polarized adhesion layer.

Exemplary embodiments of high refractive index, polarized spectacle lenses are disclosed below.

The present disclosure further provides a process for the production of a high refractive index, polarized spectacle lens, comprising a high refractive index lens substrate and a multi-layer, polarized film. Moreover, the present disclosure discloses spectacles comprising a high refractive index, polarized spectacle lens and the use of a high refractive index, polarized spectacle lens in spectacles.

Within the meaning of this disclosure, a high refractive index typically is a refractive index of $n \geq 1.515$, more typically of $n \geq 1.520$ and even more typically of $n \geq 1.533$.

The high refractive index, polarized spectacle lenses may or may not have vision correcting properties.

It will be appreciated that, throughout this disclosure, when reference is made to the adhesion and support layers being between or adjacent to other layers, or being internal or external, this does not preclude the possibility of there being other functional layers between or adjacent those adhesion and support layers. For example, an adhesion layer could be coated with another layer which could function as a barrier layer as well as a further adhesion layer. The function of such a barrier layer might be to prevent interaction of isocyanates in the lens substrate with dyes in a PVA adhesion layer, for example, during lens curing (to otherwise prevent large color shifts). Additionally, intermediate layers may be provided between adhesion layers and the support layer, such intermediate layers being provided if, e.g., assistance is needed with the chemical or physical bonding of the adhesion layers to the support layer.

In an exemplary embodiment of the disclosure, the multi-layer, polarized film is protected by protective layers not intended for the ultimately use in spectacles, but present to protect the multi-layer film against inter alia dirt, scratching or other damages during handling and prior to use. The protective layers remain on the multi-layer, polarized film during transportation, film cutting, handling, and bending, and are removed at the point of assembly, typically in a clean environment, to produce the inventive high refractive index polarized spectacle lens.

The adhesion layers typically comprise a polyvinyl alcohol-type layer selected from one or more of the group of polyvinyl alcohol (PVA), polyvinyl formal (PVF), polyvinyl acetate (PVAc), a saponified (ethylene/vinyl acetate) copolymer, or a mixture thereof. An adhesion layer may be either a polarized adhesion layer or a non-polarized adhesion layer.

Typically, each adhesion layer adjacent to the high refractive index lens substrate has an adhesion strength between the adhesion layer and the lens substrate that is equal to or greater than 60 N/mm$^2$, typically equal to or greater than 73 N/mm$^2$, further typically equal to or greater than 86 N/mm$^2$ and more typically equal to or greater than 100 N/mm$^2$, in order to have sufficient resistance to lens edging during prescription frame-fitting to avoid undesirable layer separation. In an exemplary embodiment the adhesion strength between the adhesion layer and the lens substrate is in the range of from 93 N/mm$^2$ to 380 N/mm$^2$, typically in the range of from 109 N/mm$^2$ to 355 N/mm$^2$, more typically in the range of from 121 N/mm$^2$ to 340 N/mm$^2$, even more typically in the range of from 135 N/mm$^2$ to 322 N/mm$^2$ and particularly typically in the range of from 151 N/mm$^2$ to 301 N/mm$^2$. In this respect, the adhesion strength referred to here is that measured by layer separation using a universal testing machine (typically an Instron™ twin motorized ball screw universal testing machine).

According to the disclosure, at least one adhesion layer is a polarized adhesion layer, being a layer having polarizing properties by incorporating one or more dichroic dyes, iodine, or other suitable dyes into the adhesion layer, typically a polyvinyl alcohol-type layer. The adhesion layer having polarizing properties, typically a polyvinyl alcohol-type layer, may be a layer of polyvinyl alcohol (PVA), polyvinyl formal (PVF), polyvinyl acetate (PVAc), a saponified (ethylene/vinyl acetate) copolymer or a blend thereof. A layer of PVA is common as adhesion layer having polarizing properties.

Typical dichroic dyes comprise at least one of the functional groups: an azo-compound bearing the functional group R—N=N—R', in which R and R' can be either aryl or alkyl; a naphtha-compound; or an anthraquinone compound. Typical, non-limiting, examples include: C.I. Direct Blue 67, C.I. Direct Blue 90, C.I. Direct Blue 200, C.I. Direct Green 59, C.I. Direct Violet 48, C.I. Direct Red 39, C.I. Direct Red 81, C.I. Direct Red 83, C.I. Direct Red 89, C.I. Direct Orange 39, C.I. Direct Orange 72, C.I. Direct Yellow 34, C.I. Direct Green 26, C.I. Direct Green 27, C.I. Direct Green 28, C.I. Direct Green 51, C.I. Direct Black 170, and combinations thereof.

In an exemplary embodiment of the disclosure, the multi-layer, polarized film comprises two discrete adhesion layers having polarizing properties directly adjacent to each other, wherein the two layers are of a different chemical composition, e.g., a PVA layer and a PCAc layer. In this exemplary embodiment identical or different dichroic dyes and/or iodine may be incorporated in the two layers.

In an exemplary embodiment of the disclosure, the multi-layer, polarized film comprises only one discrete adhesion layer having polarizing properties adjacent to the high refractive index substrate and/or an adhesion layer and/or a support layer. The discrete adhesion layer having polarizing properties typically comprises PVA and at least one dichroic dye and/or iodine.

Each adhesion layer of the multi-layer, polarized film, irrespective of whether the adhesion layer is polarized or not, typically has a layer thickness ranging from about 20 micron to about 120 micron, more typically ranging from 20 micron to 120 micron, even more typically ranging from 23 micron to 100 micron, yet even more typically ranging from 24 micron to 75 micron, particularly typically ranging from 26 micron to 61 micron and quite particularly typically ranging from 30 micron to 50 micron.

In an exemplary embodiment of the disclosure, the multi-layer, polarized film has a total thickness ranging from 70 micron to 350 micron, typically from 76 micron to 333 micron, more typically from 80 micron to 321 micron, particularly typically from 83 micron to 311 micron and quite particularly typically from 81 micron to 291 micron.

PVA bonds well with high refractive index lens substrates and is thus a good choice for an adhesion layer that may be also a polarized layer. In an exemplary embodiment of the present disclosure, a polarized adhesion layer, typically a PVA layer comprising at least one dichroic dye and/or iodine, for the spectacle lens is an outer layer of the multi-layer, polarized film, and thus is the layer in direct contact with the high refractive index lens substrate. Typically, at least one polarized adhesion layer is in direct contact with the convex side of the high refractive index lens substrate to be positioned opposite to the wearer' eye in the spectacles.

If only one of the adhesion layers of a multi-layer film consisting of two adhesion layers and one support layer is a polarized adhesion layer, then it is common for the other, non-polarized adhesion layer to be a layer that also bonds well to the high refractive index lens substrate, typically to the high refractive index lens substrate on the concave side of the multi-layer film facing the wearer's eye. For ease of understanding, common options for such a non-polarized adhesion layer will be described below after the description of the common high refractive index lens substrates.

The at least one transparent support layer of the multi-layer, polarized film typically acts to provide isotropic support to the adhesion layers and thus to the multi-layer, polarized film, particularly during manufacture of the film and its subsequent handling and use during the manufacture of spectacle lenses. In a common form, there is only one such support layer in the multi-layer film, which is located between the two adhesion layers, one or both of which are the polarized layers.

The at least one support layer typically has a layer thickness in the range of from 60 micron to 160 micron, typically from 70 micron to 100 micron, further typically from 73 micron to 88 micron, particularly typically about 80 micron and quite particularly typically in the range of from 77 micron to 84 micron. The at least one support layer typically has a tensile strength greater than or equal to 80 N/mm$^2$, more typically greater than or equal to 95 N/mm$^2$. Further, at least one support layer typically has a percent elongation (also known as "elongation after fracture") of greater than or equal to 15%, more typically greater than or equal to 23%. If the multi-layer, polarized film comprises more than one support layer, the before mentioned values apply accordingly. In an exemplary embodiment of the present disclosure, the at least one support layer has a tensile strength greater or equal to 83 N/mm$^2$ and a percent elongation of greater than or equal to 17%.

Typically, the at least one support layer should not be too hard and should have a similar hardness to the lens substrate. Also typically, the at least one support layer has a hardness in the range of from 60 to 120 N/mm$^2$, further typically of from 71 to 116 N/mm$^2$, particularly typically of from 86 to 113 N/mm$^2$ and quite particularly typically of from 100 to 110 N/mm$^2$. Hardness is defined as ball indentation hardness, with 30 pieces of stacked film and a measured time of 30 seconds. In this respect, if the at least one support layer is too hard, then there can be a film separation affect during edging due to the resistance of the support layer to edging, particularly when edging equipment such as diamond composite grinding wheels are used. If the at least one support layer is too soft then distortions can occur within the layer itself, which appear as optical waves in the spectacle lens because the support layer is not providing sufficient rigidity to resist the influence of shrinkage and monomer flows during curing.

The at least one support layer may be a transparent polymer such as cellulose based polymers such as diacetylcellulose and triacetyl cellulose (TAC), cellulose acetate butyrate (CAB); polycarbonate (PC) based polymers; polyester based polymers such as polyethylene terephthalate (PET), polyethyleneterephthalate glycol (PETG) and polyethylene naphthanate; dimethyl terephthalate (DMT); acrylate based polymers such as polymethacrylate (PMA), polyethylacrylate; methacrylate polymers such as polymethyl methacrylate (PMMA), polyethyl methylacrylate; thermoplastic urethane polymers (TPU); polythiourethane based polymers; vinyl based polymers such polyvinyl chloride, polyvinyl alcohol, polyvinylidene chloride, polyvinyl butyral; styrene based polymers such as polystyrene, styrene methylmethacrylate copolymers (SMMA), styrene maleic anhydride polymers (SMA), acrylonitrile-styrene (ANS) copolymers, acrylonitrile butadiene styrene (ABS) terpolymers, (meth)acrylate butadiene styrene (MBS) terpolymers; olefin based polymers such as polyethylene, polypropylene, polymethylpentene (PMP), cyclic (COC) or norbornene structure-containing polyolefins, and ethylene-propylene copolymers; amide based polymers such as nylon and aromatic polyamides; imide based polymers; polyether imide based polymers; polysulfone based polymers; polyether sulfone based polymers; polyether ether ketone based polymers; polyphenylene sulfide based polymers; polyoxymethylene based polymers; and epoxy based polymers, or any blend thereof. In a common form, the at least one transparent support layer will be triacetyl cellulose (TAC), polycarbonate (PC), cellulose acetate butyrate (CAB), polymethyl methacrylate (PMMA), or polyethylene terephthalate (PET). In a typical form, the at least one transparent support layer will be TAC, PET or PC, with TAC being most common. Typically, the polymers usable as a support layer have high optical clarity and bond well with polyvinyl alcohol-type polarizing layers.

The high refractive index lens substrate is typically selected from one or more of the group consisting of polyurethanes, such as urethane and thiourethane polymers and copolymers, episulfides, halogen substituted derivatives of bisphenol-A, and aromatic (meth)acrylic copolymers. In a typical form, the high refractive index lens substrate will be a polyurethane, typically a urethane or thiourethane polymer or copolymer.

In a typical form, the high refractive index lens substrate will be a thiourethane polymer or copolymer obtained by polymerisation of isocyanate compounds and thiol compounds. Suitable isocyanate compounds can be classified as aromatic compounds, aliphatic compounds and alicyclic compounds, and can be such as:
Aromatic Isocyanate Compounds
2,4-Toluylendiisocyanate
1,5-Naphthalenediisocyanate
4,4'-Diphenylmethanediisocyanate
4,4'-Diphenylsulfonediisocyanate
Aliphatic Isocyanate Compounds
Hexamethylene diisocyanate
Octamethylene diisocyanate
Bis(isocyanatoethyl)sulphide
Bis(isocyanatoethyl)disulphide
m-Xylylenediisocyanate
Alicyclic Isocyanate Compounds
Isophoronediisocyanate
4,4'-Diisocyanatodicyclohexylmethane
1,3-Bis(isocyanatomethyl)cyclohexane
2,5(6)-Bis(isocyanatemethyl)bicyclo-[2.2.1]-heptane
Suitable thiol compounds can be classified as aromatic thiol compounds, aliphatic thiol compounds, or alicyclic thiol compounds, such as:
Aromatic Thiol Compounds
1,3-Dimercaptobenzene
1,3,5-Trimercaptobenzene
Bis(mercaptophenyl)sulphide
Aliphatic and Alicyclic Thiol Compounds
Pentaerythritol tetra (3-mercaptopropionate)
Pentaerythritol tetra (2-mercaptoacetate)
4-Mercaptomethyl-1,8-dimercapt-3,6-dithiaoctane
5,7-Dimercaptomethyl-1,11-dimercapto-3,6-trithiaundecane
Bis(mercaptoethyl)sulphide
2,5-Bis(mercaptomethyl)-1,4-dithiane Typical high refractive index thiourethane lens substrates are those manufactured by Mitsui Chemicals Inc. under the MR Series brand, particularly the MR-7™, MR-8™, and MR-10™ thiourethanes.

Returning to a description of typical materials for a non-polarized adhesion layer, where the multi-layer, polarized film includes only one polarized adhesion layer, again the preferred material may be a polyvinyl alcohol-type layer, typically a layer of polyvinyl alcohol (PVA), polyvinyl formal (PVF), polyvinyl acetate (PVAc), or a saponified (ethylene/vinyl acetate) copolymer. In case the non-polarized adhesion layer is directly adjacent to the lens substrate, the material used as non-polarized adhesion layer typically is matched to the high refractive index lens substrate so as to be a material that bonds/adheres well to the substrate, such as for instance would be the case with a PVA adhesion layer and a thiourethane lens substrate of the type mentioned above, typically the thiourethane obtained by polymerisation of isocyanate compounds and thiol compounds. PVA adheres well to the thiourethane because PVA has —OH functional groups which bond to isocyanate functional groups in the same way as an isocyanate monomer reacts with a thiol or polyol monomer.

In an exemplary embodiment of the disclosure, alternatively to a polyvinyl alcohol-type layer, a known type of polyurethane adhesive, such as a thermal or UV curable glue, a hot melt adhesive (HMA), or a pressure sensitive adhesive (PSA), may be used as a non-polarized adhesion layer.

It should also be noted that the adhesion layers and/or the support layer(s) may incorporate one or more functional dyes containing active optical properties such as fashion colored dyes, enhanced spectral colored dyes, blue spectral absorbing dyes, UV absorbing dyes, photochromic dyes, infrared absorption dyes, narrow band absorption dyes, or any combination thereof.

Indeed, in one form where the multi-layer, polarized film includes only two adhesion layers and one support layer in-between, fixed color dyes may be added to the second adhesion layer, being the layer of the multi-layer polarizing film on the concave side, next, but not necessarily adjacent, to the substrate surface, whilst the first adhesion layer, being the layer of the multi-layer polarizing film on the convex side, next, but not necessarily adjacent, to the substrate surface, already contains dichroic dyes or some other functional dyes. The fixed color dye in this case could have spectral properties that benefit the spectacles wearer by enhancing or blocking specific light wavelengths. Examples would be the addition of blue blocking dyes, UV blocking dyes or narrow wavelength color blocking dyes.

Dyes could also be added to the at least one supporting layer during its manufacture. Therefore, in one exemplary embodiment of the disclosure, where the multi-layer, polarized film includes only two adhesion layers and one support layer in-between, it is possible that each of the three layers of the multi-layer, polarized film can have a different function. For example, the second adhesion layer can contain UV absorbing dyes, the support layer can contain a narrow wavelength fixed color dye, whilst the first adhesion layer can contain dichroic dyes for glare protection. In this exemplary embodiment, the first adhesion layer is the layer of the multi-layer, polarized film, which is located on the convex side, opposite to a wearer's eye in the spectacles, whereas the second adhesion layer is located on the concave side facing a wearer's eye in the spectacles.

Ideally, the refractive index of the layers of the multi-layer, polarized film will match the refractive index of the lens substrate. In this respect, in relation to the support layer, PET has a refractive index (1.575) that closely matches to a 1.592 refractive index lens substrate material, such as the common MR8™ thiourethane material mentioned above, and thus is one typical material for the at least one support layer. However, TAC as support layer gives a better performance in casting, but has a refractive index of 1.47 to 1.49, which is somewhat further away from the common MR8™ thiourethane material refractive index of 1.592 mentioned above. PVA, usable as adhesion layer, has a refractive index of about 1.52 to 1.55.

In this respect, the greater the difference in refractive index between the layers the more likely and more persistent reflections can occur, which can be annoying to wearers of spectacles. Also, reflected light can interfere with incoming light in such a way to cause interference fringes which manifest as bands of colored reflections from constructive and destructive light wave interference. This is likely when the layer thicknesses are very small and close to multiples or halves of the wavelength of the incoming light. In the case of the multi-layer, polarized film in the present disclosure, the thicknesses of the layers are typically much larger than those required to affect interference fringes that result in colored reflections. Therefore, the larger refractive index difference between TAC, PVA and the common thiourethane substrates tend not to have the effect of creating interference fringes.

However, general reflections are still present but similar to reflections from polarized lenses made from only a single layer PVA polarized film where the PVA refractive index also has a large difference compared to a high refractive index substrate.

Moreover, it will be appreciated that all layers in the multi-layer, polarized film must be optically transparent, i.e., transmit at least a portion of the visible light.

In an exemplary embodiment of the disclosure, the multi-layer, polarized film may be applied on one of the surfaces of the high refractive index lens substrate, namely the convex side of the surface intended to face the wearer's eye or the concave side of the surface intended to face the surface opposite to the wearer's eye.

In another exemplary embodiment of the disclosure, the multilayer polarized film is embedded in the high refractive index lens substrate. In this exemplary embodiment, the thickness of the lens substrate on the concave side is typically in the range of from 0.35 mm to 17.90 mm, more typically of from 0.36 mm to 17.00 mm, particularly typically of from 0.37 mm to 16.00 mm, and more particularly typically of from 0.38 mm to 15.80 mm, and the thickness of the lens substrate on the convex side is typically in the range of from 0.41 mm to 1.19 mm, more typically of from 0.42 mm to 1.15 mm, particularly typically of from 0.43 mm to 1.13 mm, and more particularly typically of from 0.44 mm to 1.10 mm.

The present disclosure also provides a process for the production of the high refractive index polarized spectacle lens described above, the process including the steps of a. forming a multi-layer, polarized film comprising a transparent support layer between a first adhesion layer and a second adhesion layer, wherein at least one adhesion layer is a polarized adhesion layer;

b. matching the shape of the polarized film to the shape of the front surface of an spectacle lens mold;

c. stabilizing the shaped film of step b;

d. placing the shaped and stabilized film of step c within a lens casting assembly for the mold;

e. holding the shaped polarized film close to the front mold surface by a gasket;

f. injecting a high refractive index lens substrate liquid monomer into the lens casting assembly via a filling port whereby the monomer is able to flow around the shaped polarized film covering both sides of the film to completely fill the assembly, and g. curing the lens substrate around the polarized film to form an spectacle lens.

Typically, the shape matching of step b is achieved by taking the flat multi-layer, polarized film and cutting the film to a pre-determined shape, placing the cut film onto a bending machine where it is clamped in position, applying the curved shape to the film via a mold pressing step where the press mold is heated, allowing the shape to form and stabilize, cooling and removal of the shaped film from the bending machine.

Further typically, in step c the shaped film is further stabilized by placing the shaped film between matching glass setting molds which are then placed in an oven to set the film curve.

Further typically, the curing step g is performed by placing the filled assembly inside an air circulating oven and applying a temperature profile cure designed to provide a gentle shrinkage rate and avoid creation of bubbles and strain during curing.

In a particular form, the shaped multi-layer, polarized film is typically positioned towards the front of the lens mold, and thus the front convex side of the spectacle lens, typically at a depth from the front surface of 0.4 mm to 1.2 mm, or at the front of the lens mold, to avoid depolarizing effects due to birefringent polymer in front of the polarized film. Typically, the multi-layer, polarized film is embedded in the high refractive index lens substrate in such a way that the at least one polarized adhesion layer of the multi-layer, polarized film is facing the front convex side of the lens where income light passes firstly in order to block horizontally polarized light known as glare before being depolarized by bulk polymer.

In an exemplary embodiment of the disclosure, the high refractive index, polarized spectacle lens comprises a high refractive index lens substrate and a multi-layer, polarized film, wherein the multi-layer, polarized film embedded in the lens substrate comprises at least:
a) a non-polarized adhesion layer, comprising a polyvinyl alcohol (PVA) layer, a polyvinyl formal (PVF) layer, a polyvinyl acetate (PVAc) layer, a saponified (ethylene/vinyl acetate) copolymer layer, a polyurethane adhesive layer, a holt melt adhesive (HMA) layer, a pressure sensitive adhesive (PSA) layer,
b) a transparent support layer, comprising a triacetyl cellulose (TAC) layer, a polycarbonate (PC) layer, a cellulose acetate butyrate (CAB) layer, a polymethyl methacrylate (PMMA) layer or a polyethylene terephthalate (PET) layer and
c) a polarized adhesion layer comprising a polyvinyl alcohol (PVA) layer, a polyvinyl formal (PVF) layer, a polyvinyl acetate (PVAc) layer or a saponified (ethylene/vinyl acetate) copolymer layer, the polarized adhesion layer comprising at least one dichroic dye and/or iodine,
wherein the at least one polarized adhesion layer of the multi-layer, polarized film is facing the lens substrate on the convex side opposite to a wearer's eye.

In a further exemplary embodiment of the disclosure, the high refractive index, polarized spectacle lens comprises a high refractive index lens substrate comprising a urethane or thiourethane polymer or copolymer and a multi-layer, polarized film, wherein the multi-layer, polarized film embedded in the lens substrate comprises at least:
a) a non-polarized adhesion layer, comprising a polyvinyl alcohol (PVA) layer or a polyvinyl formal (PVF) layer, having a layer thickness in the range of from 26 micron to 62 micron, typically in the range of from 29 micron to 52 micron,
b) a transparent support layer, comprising a triacetyl cellulose (TAC) layer, a polycarbonate (PC) layer or a polyethylene terephthalate (PET) layer, having a layer thickness in the range of from 69 micron to 89 micron, typically in the range of from 76 micron to 86 micron, and
c) a polarized adhesion layer comprising a polyvinyl alcohol (PVA) layer or a polyvinyl acetate (PVAc) layer, the polarized adhesion layer comprising at least one dichroic dye and/or iodine, having a layer thickness in the range of from 23 micron to 63 micron, typically in the range of from 24 micron to 56 micron,
wherein the at least one polarized adhesion layer of the multi-layer, polarized film is facing the lens substrate on the convex side opposite to a wearer's eye.

In an exemplary embodiment of the disclosure, the high refractive index, polarized spectacle lens comprises a high refractive index lens substrate comprising a thiourethane polymer or copolymer having a refractive index n=1.5 bis 1.7, typically n=1.592, and a multi-layer, polarized film, wherein the multi-layer, polarized film is typically embedded in the lens substrate and comprises at least:
a) a non-polarized adhesion layer adjacent to the lens substrate, comprising a polyvinyl alcohol (PVA) layer or a polyurethane adhesive layer,
b) a transparent support layer, comprising a triacetyl cellulose (TAC) layer or a polyethylene terephthalate (PET) layer, and
c) a polarized adhesion layer adjacent to the lens substrate, comprising a polyvinyl alcohol (PVA) layer or a polyvinyl formal (PVF) layer, the polarized adhesion layer comprising at least one dichroic dye and/or iodine,
wherein the at least one polarized adhesion layer of the multi-layer, polarized film is facing the lens substrate on the convex side opposite to a wearer's eye.

In a further exemplary embodiment of the disclosure, the high refractive index, polarized spectacle lens comprises a high refractive index lens substrate comprising a thiourethane polymer or copolymer having a refractive index n=1.5 bis 1.7, typically n=1.592, and a multi-layer, polarized film, wherein the multi-layer, polarized film is typically embedded in the lens substrate and comprises at least:
a) a non-polarized adhesion layer, comprising a polyvinyl alcohol (PVA) layer or a polyurethane adhesive layer,
b) a transparent support layer, comprising a triacetyl cellulose (TAC) layer or a polyethylene terephthalate (PET) layer,
c) a non-polarized adhesion layer, comprising a polyvinyl alcohol (PVA) layer or a polyurethane adhesive layer,
d) a polarized adhesion layer adjacent to the lens substrate, comprising a polyvinyl alcohol (PVA) layer or a polyvinyl formal (PVF) layer, the polarized adhesion layer comprising at least one dichroic dye and/or iodine,
wherein the at least one polarized adhesion layer of the multi-layer, polarized film is facing the lens substrate on the convex side opposite to a wearer's eye.

In a further exemplary embodiment of the disclosure, the high index, polarized ophthalmic lens is formed from a high index lens substrate and a multi-layer polarized film, the multi-layer polarized film including a transparent support layer between a first adhesion layer and a second adhesion layer, wherein one or both of the adhesion layers are polarized layers.

BRIEF DESCRIPTION OF THE DRAWINGS

The disclosure will not be described with reference to the drawings wherein.

DESCRIPTION OF EXEMPLARY EMBODIMENTS

Having briefly described the general concepts involved with the present disclosure, an exemplary embodiment of a polarized spectacle lens will now be described that is in accordance with the present disclosure. However, it is to be understood that the following description is not to limit the generality of the above description.

Figure 1:
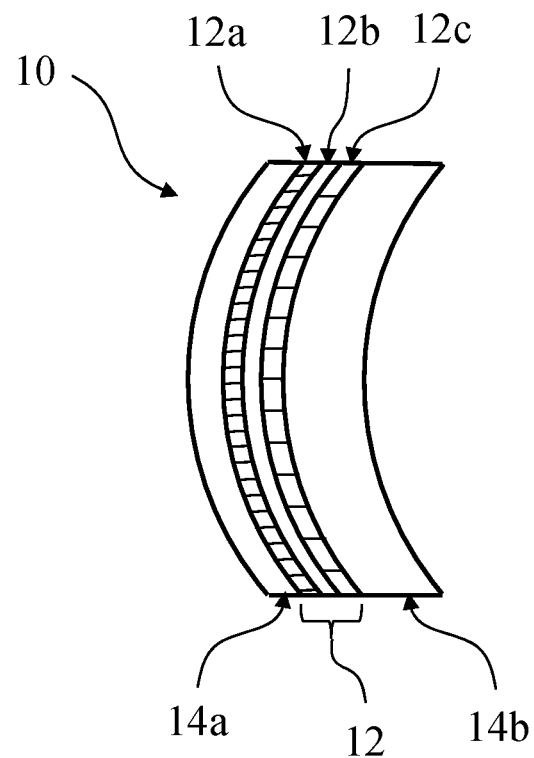
FIG. 1 is a side elevation, in cross-section, of a high refractive index, polarized spectacle lens in accordance with an exemplary embodiment of the present disclosure.

Illustrated in FIG. 1 is a high refractive index, polarized spectacle lens 10 showing the orientation of a multi-layer, polarized film 12 embedded in a high refractive index lens substrate (14a,14b). The lens substrate is formed on the front side and on the back side of the polarized film 12, i.e., lens substrate 14a is formed on the convex side of polarized film 12 and lens substrate 14b is formed on the concave side of polarized film 12. In this exemplary embodiment, the lens substrate is typically a thiourethane lens substrate, more typically the MR-8™ thiourethane material mentioned above.

In an exemplary embodiment of the disclosure, the multi-layer, polarized film 12 has three layers, i.e. layer 12a, layer 12b, and layer 12c. Layer 12a is a polarized adhesion layer, being a stretched PVA layer with a layer thickness ranging from between 20 micron and 120 micron, and more typically from between 30 micron and 50 micron, and containing at least one dichroic dye.

Layer 12b is a support layer with a thickness ranging of from between 60 micron and 160 micron, further typically of from between 70 micron and 100 micron and particularly of from between 76 micron and 84 micron, which in this exemplary embodiment is TAC. This TAC support layer has a ball indentation hardness ranging from 60 to 120 $N/mm^2$, a tensile strength greater than or equal to 80 $N/mm^2$, and a percent elongation greater than or equal to 15%.

Layer 12c is a non-polarized adhesion layer, whose role is typically for adhesion purposes and is again a PVA layer, with a thickness ranging of from 20 micron to 120 micron, or more typically of from 30 micron to 50 micron. PVA works well as an adhesion layer when the lens substrate is a polyurethane because the isocyanate functional groups in the urethane chemically bonds to the available —OH groups in the PVA during curing, providing a strong adhesion between the urethane substrate and the adhesion layer.

As mentioned above, layer 12c could also be a functional adhesion layer, again being a stretched PVA layer containing dichroic dyes, photochromic dyes, broad band fixed color dyes, narrow band fixed color dyes, UV absorbing dyes, or other functional dyes. It should also be appreciated that layers 12a and 12c can have additional functional purposes, in addition to providing adhesion to a lens substrate.

When configured for a polarized spectacle lens, it is common that the polarized adhesion layer 12a be positioned on the convex side of the film 12 during the formation of the film 12, to avoid any depolarization effects in the final spectacle lens. In this respect, if, in this exemplary embodiment, the active polarizing layer were on the concave side, the light must pass through the convex side 14a of the lens, the non-polarized adhesion layer adjacent to the substrate 14a, and the support layer before being filtered by the polarized adhesion layer. The light passing through so many layers can be at least partially depolarized before reaching an active polarizing layer, which can reduce the efficiency of the polarizing filter.

In a further exemplary embodiment of the disclosure, the thickness of the lens substrate on the convex side 14a of the lens will be no thicker than 1.2 mm, and will be in the thickness range of 0.4 mm to 1.2 mm. The thickness of the lens substrate on the concave side 14b will be no thinner than 0.3 mm, and will be in the thickness range of 0.3 mm to 18.00 mm.

Figure 2:
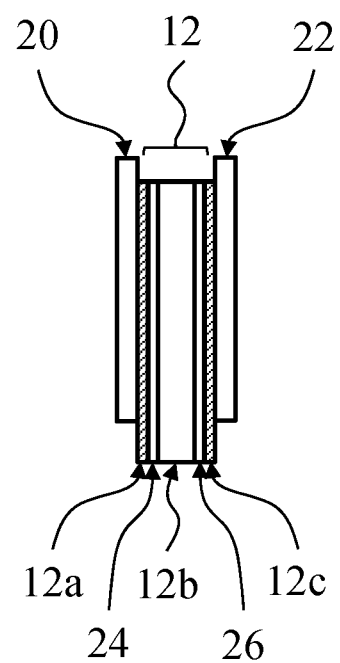
FIG. 2 is a side elevation, in cross-section, of the multi-layer, polarized film seen in FIG. 1, prior to use in an spectacle lens, showing two protective layers for the film, the protective layers being used prior to manufacture of the spectacle lens of FIG. 1.

Shown in FIG. 2 is the multi-layer, polarized film 12 of FIG. 1, prior to being embedded in a lens substrate and thus prior to the formation of a spectacle lens. The layers marked as layers 20 and 22 are protective layers, present to protect the layer underneath against dirt and fluff accumulation on a surface of the film 12 from the environment, as well as protection against scratching and contact damage during handling and prior to use. The protective layers thus remain on the film during transportation, film cutting, handling and bending, and are only removed at the point of assembly in a clean environment, thereby providing the best opportunity for the production of a clean, high quality spectacle lens.

This is not possible with conventional PVA polarized films because conventional PVA polarized films are too delicate and require any protective layers to be removed before bending. Indeed, in these conventional forms, if protective layers were allowed to remain on the polarized film during bending, it would be nearly impossible to remove a protective layer from a PVA layer after bending without damaging the PVA layer. This means that such conventional PVA polarized film is limited in its use and ultimately the quality of lenses made from such conventional PVA polarized film is lower, or the production yield is lower, which significantly increases cost.

Protective layers 20 and 22 can be constructed from different materials or can be of the same material. Typical materials used for the protective layers 20, 22 are polypropylene (PP) or polyethylene (PE), which are typically about 30 micron in thickness. In this respect, a PE protective layer is generally harder to peel away whereas a PP protective layer is easier to peel but can impart its texture to the layer underneath during lamination and bending processes. PE is thus the commonly used material. For thermal resistance during the bending process, a protective layer that is a laminate combining both PE and PP can also be used.

Generally, the protective layers 20, 22 will be held lightly against the underlying multi-layer, polarized film 12 so that the protective layers 20, 22 can be easily peeled away by hand. In this respect, "held lightly" means that the layer is not chemically bonded to a surface, but is held by weak localized static and vacuum forces. In this exemplary embodiment, no adhesive is used between the protective layers 20, 22 and the adhesion layers 12a, 12c.

Further, in FIG. 2 there can be seen a first intermediate layer 24 that is a primer which binds chemically to the layers 12a and 12b. Similarly, a second intermediate layer 26 can also be seen, which binds layers 12b and 12c together. The intermediate layers 24, 26 can be the same or a different material, and in this exemplary embodiment are either a thermally curable or UV curable primer resin, and are ideally between about 1 micron and 4 micron in thickness.

It will be appreciated that there may be other variations and modifications not described herein that are also within the scope of the present disclosure.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A high refractive index, polarized spectacle lens comprising:
   a multi-layer, polarized film; and
   a high refractive index lens substrate arranged on at least one surface of the multi-layer, polarized film,
   wherein the multi-layer, polarized film includes at least one transparent support layer and at least two adhesion layers,
   wherein at least one of the adhesion layers is a polarized adhesion layer,
   wherein the at least one transparent support layer is located between the at least two adhesion layers,
   wherein the polarized adhesion layer is arranged directly adjacent to the high refractive index lens substrate.

2. A high refractive index, polarized spectacle lens comprising:
   a multi-layer, polarized film; and
   a high refractive index lens substrate arranged on at least one surface of the multi-layer, polarized film,
   wherein the multi-layer, polarized film includes at least one transparent support layer and at least two adhesion layers,
   wherein at least one of the adhesion layers is a polarized adhesion layer,
   wherein the at least one transparent support layer is located between the at least two adhesion layers, and
   wherein the adhesion layer adjacent to the high refractive index lens substrate has an adhesion strength between the adhesion layer and the lens substrate that is equal to or greater than 60 N/mm2.

3. The polarized spectacle lens according to claim 1, wherein each adhesion layer has a layer thickness in a range of from 20 micron to 120 micron.

4. The polarized spectacle lens according to claim 1, wherein at least one adhesion layer of the at least two adhesion layers is a non-polarized adhesion layer.

5. The polarized spectacle lens according to claim 1, wherein the at least one non-polarized adhesion layer comprises a non-polarized layer material selected from the group consisting of polyvinyl alcohol (PVA), polyvinyl formal (PVF), polyvinyl acetate (PVAc), a saponified (ethylene/vinyl acetate) copolymer, a polyurethane adhesive, a holt melt adhesive (HMA), and a pressure sensitive adhesive (PSA), or a mixture thereof,
   wherein the at least one polarized adhesion layer comprises a polarized layer material selected from the group consisting of the polyvinyl alcohol (PVA), the polyvinyl formal (PVF), the polyvinyl acetate (PVAc), and the saponified (ethylene/vinyl acetate) copolymer, or a mixture thereof, and
   wherein the at least one polarized adhesion layer further comprises a dichroic dye, iodine, or the dichroic dye and iodine.

6. A high refractive index, polarized spectacle lens comprising:
   a multi-layer, polarized film; and
   a high refractive index lens substrate arranged on at least one surface of the multi-layer, polarized film,
   wherein the multi-layer, polarized film includes at least one transparent support layer and at least two adhesion layers,
   wherein at least one of the adhesion layers is a polarized adhesion layer,
   wherein the at least one transparent support layer is located between the at least two adhesion layers, and
   wherein the at least one transparent support layer has a layer thickness in a range of from 60 micron to 160 micron.

7. A high refractive index, polarized spectacle lens comprising:
   a multi-layer, polarized film; and
   a high refractive index lens substrate arranged on at least one surface of the multi-layer, polarized film,
   wherein the multi-layer, polarized film includes at least one transparent support layer and at least two adhesion layers,
   wherein at least one of the adhesion layers is a polarized adhesion layer,
   wherein the at least one transparent support layer is located between the at least two adhesion layers, and
   wherein the at least one transparent support layer has a ball indentation hardness in a range of from 60 N/mm2 to 120 N/mm2.

8. A high refractive index, polarized spectacle lens comprising:
   a multi-layer, polarized film; and
   a high refractive index lens substrate arranged on at least one surface of the multi-layer, polarized film,
   wherein the multi-layer, polarized film includes at least one transparent support layer and at least two adhesion layers,
   wherein at least one of the adhesion layers is a polarized adhesion layer,
   wherein the at least one transparent support layer is located between the at least two adhesion layers, and
   wherein the at least one transparent support layer has a tensile strength greater than or equal to 80 N/mm2.

9. A high refractive index, polarized spectacle lens comprising:
   a multi-layer, polarized film; and
   a high refractive index lens substrate arranged on at least one surface of the multi-layer, polarized film,
   wherein the multi-layer, polarized film includes at least one transparent support layer and at least two adhesion layers,
   wherein at least one of the adhesion layers is a polarized adhesion layer,
   wherein the at least one transparent support layer is located between the at least two adhesion layers, and
   wherein the at least one transparent support layer has a percent elongation greater than or equal to 15%.

10. The polarized spectacle lens according to claim 1, wherein the at least one transparent support layer comprises at least one transparent polymer selected from the group consisting of cellulose based polymers, polycarbonate (PC) based polymers; polyester based polymers; acrylate based polymers; methacrylate polymers; polythiourethane based polymers; vinyl based polymers; styrene based polymers; olefin based polymers; amide based polymers; polyether imide based polymers; polysulfone based polymers; polyether sulfone based polymers; polyether ether ketone based polymers; polyphenylene sulfide based polymers; polyoxymethylene based polymers; and epoxy based polymers, or a blend thereof.

11. The polarized spectacle lens according to claim 1, wherein the high refractive index lens substrate is selected from the group consisting of polyurethanes, episulfides, halogen substituted derivatives of bisphenol-A, and aromatic (meth)acrylic copolymers, or a blend thereof.

12. The polarized spectacle lens according to claim 1, further comprising:

a functional dye selected from the group consisting of fashion colored dyes, enhanced spectral colored dyes, blue spectral region of light absorbing dyes, UV absorbing dyes, photochromic dyes, infrared absorption dyes, narrow band absorption dyes, or a combination thereof.

13. A high refractive index, polarized spectacle lens comprising:
a multi-layer, polarized film; and
a high refractive index lens substrate arranged on at least one surface of the multi-layer, polarized film,
wherein the multi-layer, polarized film includes at least one transparent support layer and at least two adhesion layers,
wherein at least one of the adhesion layers is a polarized adhesion layer,
wherein the at least one transparent support layer is located between the at least two adhesion layers, and
wherein the multi-layer, polarized film has a total thickness in a range of from 70 micron to 350 micron.

14. The polarized spectacle lens according to claim 1, wherein the multi-layer, polarized film has a concave side and a convex side,
wherein the multi-layer, polarized film is embedded in the high refractive index lens substrate, and
wherein a thickness of the high refractive index lens substrate on the concave side is in a range of from 0.35 mm to 17.90 mm and the thickness of the high refractive index lens substrate on the convex side is in the range of from 0.41 mm to 1.19 mm.

15. The polarized spectacle lens according to claim 1, wherein the multi-layer, polarized film has a concave side and a convex side,
wherein the multi-layer, polarized film is embedded in the high refractive index lens substrate,
wherein the non-polarized adhesion layer is selected from the group consisting of a polyvinyl alcohol (PVA) layer, a polyvinyl formal (PVF) layer, a polyvinyl acetate (PVAc) layer, a saponified (ethylene/vinyl acetate) copolymer layer, a polyurethane adhesive layer, a holt melt adhesive (HMA) layer, or a pressure sensitive adhesive (PSA) layer;
wherein the at least one transparent support layer is selected from the group consisting of a triacetyl cellulose (TAC) layer, a polycarbonate (PC) layer, a cellulose acetate butyrate (CAB) layer, a polymethyl methacrylate (PMMA) layer, or a polyethylene terephthalate (PET) layer;
wherein the polarized adhesion layer is selected from the group consisting of the polyvinyl alcohol (PVA) layer, the polyvinyl formal (PVF) layer, the polyvinyl acetate (PVAc) layer, or the saponified (ethylene/vinyl acetate) copolymer layer,
wherein the polarized adhesion layer includes a dichroic dye, iodine, or the dichroic dye and iodine, and
wherein the polarized adhesion layer is located on the convex side of the multi-layer, polarized film.

16. The polarized spectacle lens according to claim 1, wherein the multi-layer, polarized film has a concave side and a convex side,
wherein the high refractive index lens substrate includes a urethane or thiourethane polymer or copolymer,
wherein the multi-layer, polarized film is embedded in the high refractive index lens substrate,
wherein the non-polarized adhesion layer is selected from the group consisting of a polyvinyl alcohol (PVA) layer or a polyvinyl formal (PVF) layer, having a layer thickness in the range of from 26 micron to 62 micron,
wherein the at least one transparent support layer is selected from the group consisting of a triacetyl cellulose (TAC) layer, a polycarbonate (PC) layer or a polyethylene terephthalate (PET) layer, having a layer thickness in the range of from 69 micron to 89 micron,
wherein the polarized adhesion layer is selected from the group consisting of the polyvinyl alcohol (PVA) layer or the polyvinyl acetate (PVAc) layer,
wherein the polarized adhesion layer includes a dichroic dye, iodine, or the dichroic dye and iodine,
wherein the polarized adhesion layer has a layer thickness in the range of from 23 micron to 63 micron, and
wherein the polarized adhesion layer is located on the convex side of the multi-layer, polarized film.

17. The polarized spectacle lens according to claim 1, wherein the multi-layer, polarized film has a concave side and a convex side,
wherein the high refractive index lens substrate includes a thiourethane polymer or copolymer having a refractive index n of from 1.5 to 1.7,
wherein the multi-layer, polarized film is embedded in the high refractive index lens substrate,
wherein the non-polarized adhesion layer is selected from the group consisting of a polyvinyl alcohol (PVA) layer or a polyurethane adhesive layer,
wherein the at least one transparent support layer is selected from the group consisting of a triacetyl cellulose (TAC) layer or a polyethylene terephthalate (PET) layer,
wherein the polarized adhesion layer is selected from the group consisting of the polyvinyl alcohol (PVA) layer or the polyvinyl formal (PVF) layer,
wherein the polarized adhesion layer includes a dichroic dye, iodine, or the dichroic dye and iodine, and
wherein the polarized adhesion layer is located on the convex side of the multi-layer, polarized film.

18. The polarized spectacle lens according to claim 1, wherein the multi-layer, polarized film has a concave side and a convex side,
wherein the high refractive index lens substrate includes a thiourethane polymer or copolymer having a refractive index n of from 1.5 to 1.7,
wherein the multi-layer, polarized film is embedded in the high refractive index lens substrate,
wherein the non-polarized adhesion layer is selected from the group consisting of a polyvinyl alcohol (PVA) layer and a polyurethane adhesive layer,
wherein the at least one transparent support layer is selected from the group consisting of a triacetyl cellulose (TAC) layer and a polyethylene terephthalate (PET) layer,
wherein the polarized adhesion layer is selected from the group consisting of the polyvinyl alcohol (PVA) layer and the polyvinyl formal (PVF) layer,
wherein the polarized adhesion layer includes a dichroic dye, iodine, or the dichroic dye and the iodine, and
wherein the polarized adhesion layer is located on the convex side of the multi-layer, polarized film.

19. A process for the production of a high refractive index, polarized spectacle lens, including a high refractive index lens substrate and a multi-layer, polarized film, the process comprising:
forming a multi-layer, polarized film comprising a transparent support layer between a first adhesion layer and a second adhesion layer, wherein at least one of the first adhesion layer and the second adhesion layer is a polarized adhesion layer;

matching a shape of the multi-layer, polarized film to a shape of the front surface of a spectacle lens mold to form a shaped polarized film and placing the shaped polarized film within a lens casting assembly of a mold;

stabilizing the shaped polarized film to form a stabilized polarized film;

placing the stabilized polarized film within a lens casting assembly for the mold;

holding the shaped polarized film in proximity of a front mold surface of the mold with a gasket;

injecting a high refractive index lens substrate liquid monomer into the mold via a filling port whereby the monomer flows around the shaped polarized film covering both sides of the shaped polarized film to completely fill the lens casting assembly and directly contacts the shaped polarized film, and curing the high refractive index lens substrate liquid monomer around the shaped polarized film to form a spectacle lens.

20. The process according to claim 19, further comprising:

providing the multi-layer, polarized film as a flat multi-layer, polarized film, cutting the flat multi-layer, polarized film to a pre-determined shape to form a cut film, placing the cut film onto a bending machine and clamping the cut film in position, heating and bending the cut film to apply a curved shape to the cut film, allowing the cut file to adopt the matched shape and to stabilize, and cooling and removal of the stabilized polarized film from the bending machine.

21. The process according to claim 19, wherein the stabilized polarized film is further stabilized by placing the stabilized polarized film between matching glass setting molds which are then placed in an oven to set a film curve.

22. The process according to claim 19, wherein the shaped polarized film is held in the proximity of the front mold surface at a depth from the front surface of from 0.4 mm to 1.2 mm.

23. A pair of spectacles comprising:

a high refractive index, polarized spectacle lens, wherein the spectacle lens includes a high refractive index lens substrate and a multi-layer, polarized film, wherein the multi-layer, polarized film includes at least one transparent support layer and at least two adhesion layers, wherein at least one of the adhesion layers is a polarized adhesion layer, wherein the at least one transparent support layer is located between the at least two adhesion layers, and wherein the polarized adhesion layer is arranged directly adjacent to the high refractive index lens substrate.

* * * * *